A. A. GEHRT.
Portable Hay and Cotton Press.
No. 199,052. Patented Jan. 8, 1878.
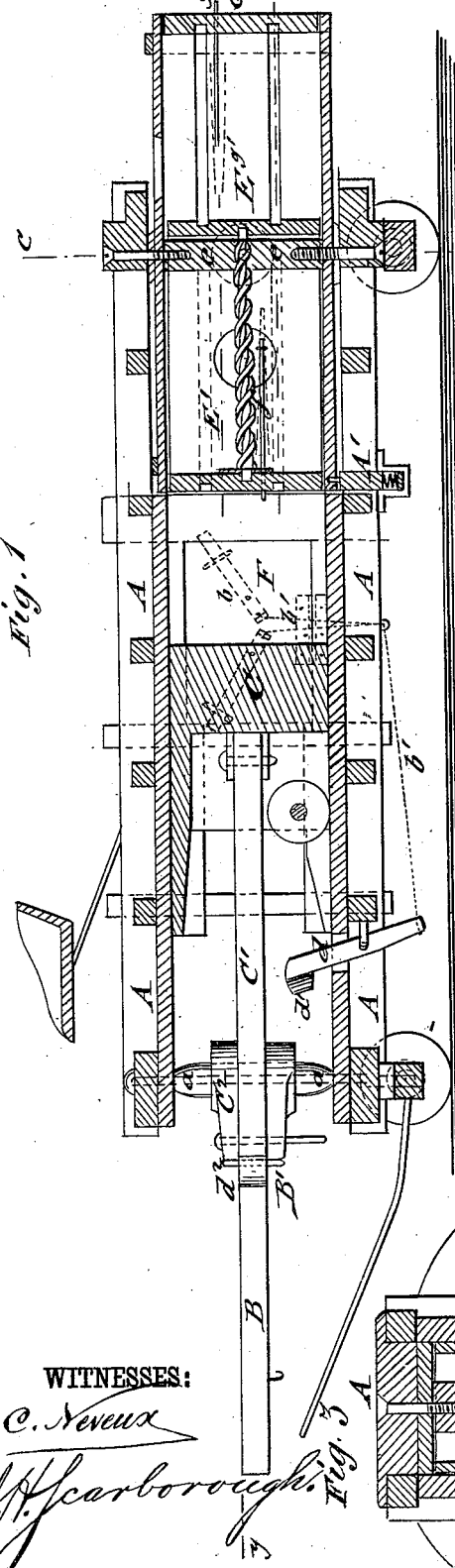
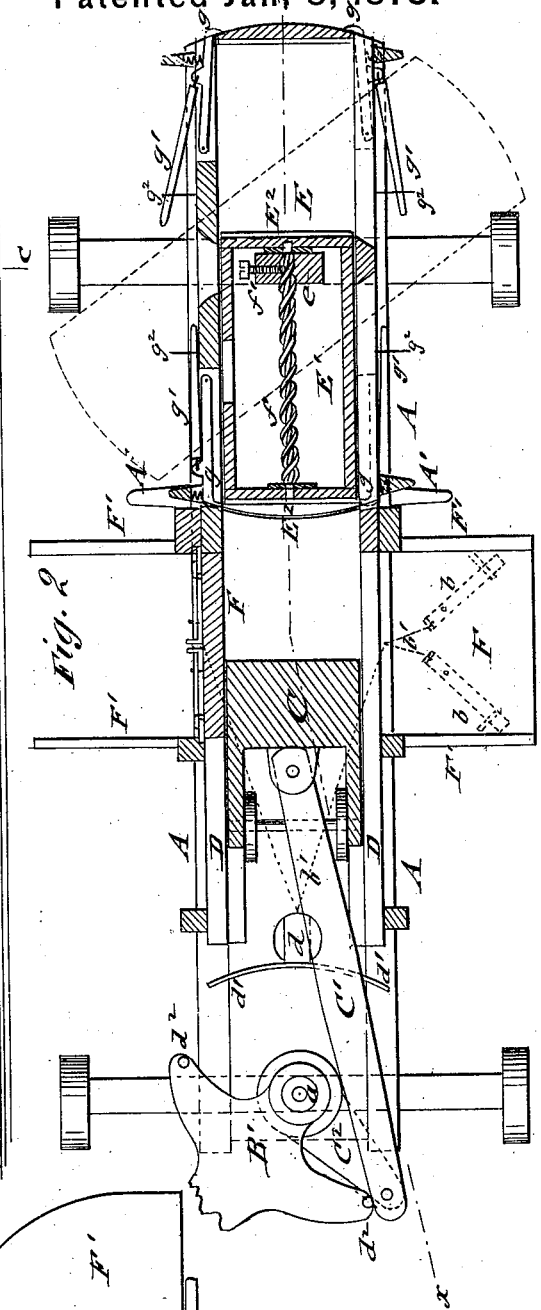
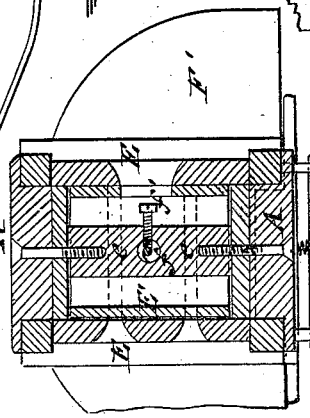
WITNESSES:
C. Neveux
J. H. Scarborough
INVENTOR:
A. A. Gehrt.
BY Munn & Co.
ATTORNEYS.

UNITED STATES PATENT OFFICE.

ALBERT A. GEHRT, OF QUINCY, ILLINOIS.

IMPROVEMENT IN PORTABLE HAY AND COTTON PRESSES.

Specification forming part of Letters Patent No. 199,052, dated January 8, 1878; application filed October 16, 1877.

*To all whom it may concern:*

Be it known that I, ALBERT A. GEHRT, of Quincy, in the county of Adams and State of Illinois, have invented a new and Improved Portable Press, of which the following is a specification:

In the accompanying drawings, Figure 1 represents a vertical longitudinal section of my improved portable hay-press on line $x\,x$, Fig. 2. Fig. 2 is a horizontal section on line $y\,y$, Fig. 1; and Fig. 3, a vertical transverse section of the same on line $c\,c$, Fig. 1.

Similar letters of reference indicate corresponding parts.

This invention has reference to an improved portable press for hay, cotton, moss, and other material, which has the advantage of baling them at the place of collection, being therefore specially adapted for the wants of farmers; and the invention consists of a press placed on wheels, and worked in horizontal manner by a follower operated by a pitman, eccentric cam, and the tongue that forms the sweep-lever.

The material to be pressed is charged through hinged side doors, which are connected by suitable lever mechanism with the eccentric-cam to be opened automatically when the follower arrives at the end of its stroke, so that a pin of the cam strikes the arm of the lever mechanism. The material is forced into the baling-chamber of a centrally pivoted and locked press-box, having an interior sliding box, with center pressure shaft or screw, that is acted upon by a pressure-screw or other devices, the gradual charging of the bale-chamber forcing the box back and moving the hooped bale out at the opposite part of the box.

A portable door is locked by spring-latches to the end of the revolving box when the bale is formed therein, and then the box unlocked and revolved on its pivots, so as to bring the head-block of the sliding box, that has arrived at the rear end, into position facing the follower.

Referring to the drawing, A represents the outer supporting-frame of my improved portable press, which is placed on wheels, the lower sills of the frame resting on the axles of the wheels, while the top sills are supported by strong upright pieces, both sills being laterally braced in suitable manner. The tongue B forms, when the press arrives at the place of work and the horses and hounds are detached from the tongue, the sweep-lever for operating the follower C. The follower is fitted into the guide-box D of frame A, and placed on wheels, so that the same runs as easily as possible in the guide-box D, which forms the front portion of the press, a revolving press-box, E, forming the rear part of the same. The follower C is operated by a pitman, $C^1$, pivoted to a swinging crank, $C^2$, of a fixed vertical shaft, $a$, at the front part of the frame A, to which the eccentric double cam B' is also centrally pivoted.

At both sides of the space between the follower C and the end of the press-box are hinged doors F, that form, when let down on suitable brackets or rests, with the side boards F', a kind of platform, on which the hay or other material is placed for being pushed into the guide-box of the follower. The doors F are closed by fulcrumed latches $b$, that drop by their own weight into side recesses of the uprights when the doors are raised into vertical position. The lower ends of the fulcrumed latches are connected, by cords $b'$ and suitable guide staples or pulleys, with the lower end of a fulcrumed lever, $d$, having horizontal arms $d^1$ extending at both sides of its upper end. The arms $d^1$ are engaged by fixed pins $d^2$ at the ends of the double cam B', whenever the follower and sweep-lever arrive at their extreme points, so that the door or doors are automatically opened by the raising of the latches consequent upon the pressure of the pin upon the arm of the operating-lever. The next charge is then put in from either side, and the door closed again for the action of the follower.

The revolving press-box E is centrally pivoted to strong cross-pieces at the rear end of the frame A, and made with arc-shaped ends, so as to revolve horizontally on the pivots, and bring either end in connection with the guide-box of the follower. The press-box E is locked into position to connect with the guide-box by a spring-acted lock-lever, A', at the bottom of the box, near its joint with the guide-box.

At the inside of the press-box is arranged a sliding box, $E^1$, with head-blocks $E^2$, the sliding box being open at the top and closed at the sides.

The sliding box $E^1$ is moved back by the pressure of the compressed material on the head-block facing the follower until the box arrives at the rear part of the outer box, and the inner head-block forms contact with a center-post, $e$, of the press-box.

The sliding box $E^1$ is provided with a central horizontal screw or shaft, $f$, that turns or slides in suitable bearings or boxes of the head-blocks, and passes through a hole of the center-post. A pressure-screw, $f'$, of the center-post bears on the thread of the screw, or on the friction-box of the post, in case a plain shaft is used, so that a certain resistance to the pressure of the follower is imparted to the sliding box, which resistance is greater the tighter the pressure-screw is adjusted to the screw or shaft. The bales may therefore be pressed more or less in proportion to the power applied and the resistance given to the sliding box.

A movable door or head-block, G, is inserted into the press-box when the same is sufficiently filled with material, and locked into position at the end of the press-box by spring-latches $g$, which are readily withdrawn by latch-levers $g^1$, that are retained in withdrawn or released position by double hooks $g^2$.

When the bale is hooped and ready to be withdrawn from the press-box, the spring-latches are withdrawn, and the door is then forced out by the pressure of the bale, which is then free to be moved out of the press-box by the gradual forming of another bale at that end of the press-box connecting with the guide-box.

The press is operated as follows: When the horses are detached from the sweep-levers, one of them is hitched to the end of the same and driven to either side until the lever is at right angles to the press. The pitman and follower are then pulled back toward the front end of the guide-box as far as possible, this, however, being only necessary to get the first charge of material into the press, as afterward the spring or expansion of the material is sufficient to force the follower back. The space between follower and head-block of sliding box is then charged with material, the door shut, and the horse turned, so that the lever swings in a half-circle. The door opens automatically when the follower arrives at the end of its stroke, and admits then the putting in of the next charge, and so on until the bale is finished, which is readily noticed by the resistance of the same to the force exerted by the horse. The movable door is then put in and the power brought to bear on the same as if there had been a charge of material, so that it is forced in sufficiently to be locked by the spring-catches at the end of the press-box. The box, being now full, is revolved after releasing the lock-lever, and the rear end brought in connection with the guide-box, which is then locked and charged as before, while the bale just compressed is hooped, being at the rear end of the press-box. When the bale is hooped the latches are withdrawn and the door dropped to the ground, the bale being then gradually pushed out of the press-box by the progressing motion of the interior sliding box. Thus as a bale is gradually formed at one end a hooped bale is forced out at the other end.

The revolving press-box may be made with four chambers in place of two, as shown in the drawing, the press being in that case a double press.

The portable press may be made of different sizes, according to the size of the bale to be produced, and requires, for being worked, one horse and two men—one for feeding, the other for hooping—and a boy to attend to the horse.

The baling is thereby accomplished in a cheap, rapid, and neat manner, and at the place where the material is collected, which is a point of advantage in hay, moss, and similar material.

Having thus described my invention, what I claim as new, and desire to secure by Letters Patent, is—

1. In a portable press, the combination of a horizontal guide-frame with a reciprocating follower, pitman, and pivoted double cam at the end of tongue or sweep-lever of press, substantially as and for the purpose set forth.

2. The combination of the hinged side doors of the guide-box, having fulcrumed latches, with a fulcrumed front lever having side arms, and with the pins of the double cam, to open the door or doors at end of forward stroke of follower, substantially as specified.

3. The combination, with a guide-box having side doors, and with a follower, of a revolving press-box at rear end of main frame, substantially as set forth.

4. The combination, with a guide-box, of main frame having side doors, and with a follower, of a revolving press-box at rear end of main frame, the press-box being locked to connect with the guide-box by a spring-acted lock-lever, substantially as and for the purpose described.

5. The combination, with the guide-frame and a reciprocating follower, of a revolving press-box capable of being locked in position on end of guide-frame, and having an interior sliding box for moving out the bale at the rear end while forming a new bale at the front end, substantially as set forth.

6. The combination, with the guide-frame and follower, of a revolving press-box, that is capable of being locked in position to connect with the guide-frame, and provided with an interior sliding box, to which a variable resistance to the pressure of the follower is imparted by adjustable friction devices, substantially as and for the purpose set forth.

7. The combination, in a portable press, of a pivoted and locked press-box, having fixed center-post, with an interior sliding box having center pressure screw or shaft and frictional devices and head-blocks, that form contact with the center-post when the sliding box arrives at either end of press-box, substantially as and for the purpose set forth.

8. The combination, in a portable press, of the press-box having spring-latches and latch-levers with a movable door or head-block that is locked to either end of box, as required, substantially as specified.

ALBERT ADOLF GEHRT.

Witnesses:
   DAVID STERN,
   J. H. HEITLAND.